(12) United States Patent
Ishimoto et al.

(10) Patent No.: US 7,739,950 B2
(45) Date of Patent: Jun. 22, 2010

(54) METHOD FOR MANUFACTURING CERAMIC ELECTRONIC COMPONENT AND GRAVURE PRINTING METHOD

(75) Inventors: Yuichi Ishimoto, Takefu (JP); Akira Hashimoto, Takefu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1069 days.

(21) Appl. No.: 11/335,055

(22) Filed: Jan. 19, 2006

(65) Prior Publication Data

US 2006/0117970 A1   Jun. 8, 2006

Related U.S. Application Data

(62) Division of application No. 10/759,111, filed on Jan. 20, 2004, now Pat. No. 7,047,880.

(30) Foreign Application Priority Data

Feb. 24, 2003   (JP)   ............... 2003-046068
May 14, 2003   (JP)   ............... 2003-135656

(51) Int. Cl.
*B41M 1/10*   (2006.01)
*B41F 9/00*   (2006.01)

(52) U.S. Cl. ............... 101/170; 101/485; 101/DIG. 36

(58) Field of Classification Search ......... 101/151–153, 101/170, 481, 485, 486, DIG. 36
See application file for complete search history.

(56) References Cited

U.S. PATENT DOCUMENTS 5,287,162 A * 2/1994 de Jong et al. ............... 399/49
5,384,592 A * 1/1995 Wong ........................ 347/116
5,716,481 A   2/1998 Kobayashi et al.
5,935,365 A   8/1999 Kobayashi et al.
2003/0002891 A1 * 1/2003 Metzler et al. ............... 399/301
2004/0163555 A1   8/2004 Ishimoto et al.

FOREIGN PATENT DOCUMENTS

| JP | 55-55870 A | 4/1980 |
|---|---|---|
| JP | 58-135692 A | 8/1983 |
| JP | 60-54492 A | 3/1985 |
| JP | 08-250370 | 9/1996 |
| JP | 2001-85271 A | 3/2001 |
| JP | 2003-133167 A | 5/2003 |
| JP | 2004-63766 A | 2/2004 |
| KR | 2002-0085290 | 11/2002 |

OTHER PUBLICATIONS

Official Communication issued in corresponding Korean Application No. 10-2004-0011789 dated Nov. 16, 2005.
Official communication issued in a counterpart Chinese Application No. 200410007020.8, mailed on Jun. 8, 2007.
Official communication issued in counterpart Japanese Application No. 2003-135656, mailed on Oct. 16, 2007.

* cited by examiner

*Primary Examiner*—Leslie J Evanisko
(74) *Attorney, Agent, or Firm*—Keating & Bennett, LLP

(57) ABSTRACT

A method for manufacturing a ceramic electronic component includes first and second gravure-printing steps in which conductive paste and step-reducing ceramic paste are printed on a composite sheet including a ceramic green sheet. A first print mark is printed before the second gravure-printing step is performed, and the position of the first print mark is determined and compared with a desired position of the first print mark before the second gravure-printing step. Then, the second gravure-printing step is performed such that a second print mark is printed at a suitable position with respect to the position of the first print mark.

9 Claims, 17 Drawing Sheets

FIG.15A
FIG.15B
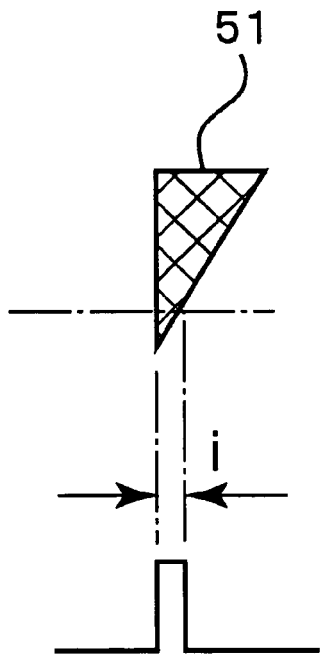
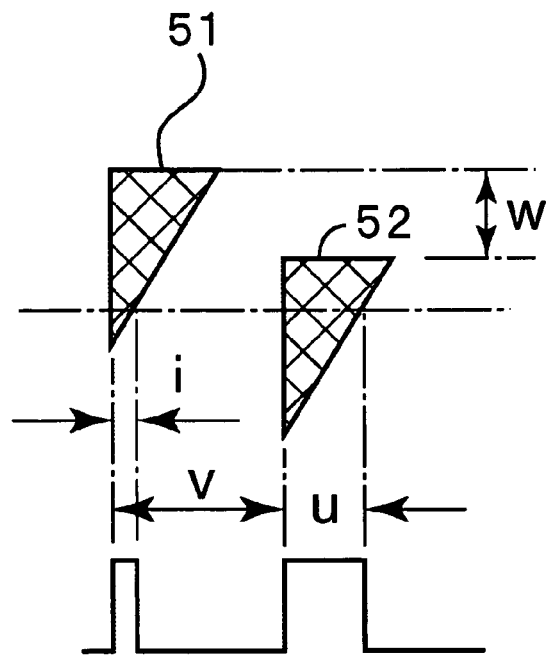

METHOD FOR MANUFACTURING CERAMIC ELECTRONIC COMPONENT AND GRAVURE PRINTING METHOD

This application is a Divisional Application of U.S. patent application Ser. No. 10/759,111 filed Jan. 20, 2004, now U.S. Pat. No. 7,047,880.

BACKGROUND OF THE INVENTION

1. Field of the Invention

The present invention relates to methods for manufacturing ceramic electronic components such as multilayer capacitors, and more specifically, to a method for manufacturing a ceramic electronic component including an improved gravure-printing step in which conductive paste is printed on a ceramic green sheet.

2. Description of the Related Art

In a manufacturing process of, for example, a multilayer ceramic capacitor, a gravure-printing method is used for printing ceramic paste and conductive paste on a ceramic green sheet disposed on a supporting film.

Japanese Unexamined Patent Application Publication No. 8-250370 discloses a method for manufacturing a multilayer ceramic capacitor in which a plurality of internal electrode patterns are formed on a dielectric green sheet disposed on a long supporting film by gravure printing using a first gravure roll and a step-reducing dielectric pattern is formed so as to fill the spaces between the internal electrode patterns by gravure printing using a second gravure roll.

In the above-described method in which the internal electrode patterns and the step-reducing dielectric pattern are formed on the long dielectric green sheet using the gravure rolls, displacement along the width of the dielectric green sheet (displacement in a direction perpendicular to the conveying direction of the dielectric green sheet) often occurs.

In the case in which the internal electrode patterns and the step-reducing dielectric pattern are printed on the dielectric green sheet as described above, when the displacement along the width of the dielectric green sheet occurs, the internal electrode patterns and the step-reducing dielectric pattern are not formed at desired locations since the internal electrode patterns and the step-reducing dielectric pattern overlap each other or intervals between them are excessively increased.

Therefore, the displacement along the width of the dielectric green sheet is corrected before the second gravure-printing step by moving the second gravure roll along its axis, that is, along the width of the dielectric green sheet.

Therefore, as shown in FIG. 17, a distorted step-reducing dielectric pattern 101b is produced depending on the timing of the movement of the gravure roll. With reference to FIG. 17, a long dielectric green sheet 102 is disposed on a supporting film, and the supporting film is conveyed in a direction shown by the arrow A. In addition, a print direction is shown by the arrow B, and a position at which the gravure roll is moved is denoted by C. Each of print patterns 101a, 101b, and 101c is printed by a single turn of the gravure roll.

In addition, there is also a problem in that the thickness of the step-reducing dielectric pattern 101b changes depending on the time at which the gravure roll is moved.

When the distortion and the change in thickness of the step-reducing dielectric pattern occur as described above, the step-reducing dielectric pattern does not provide its intended purpose, which is to eliminate the steps around the internal electrode patterns, and structural defects of the laminate such as delamination may occur.

In addition, similar to the above-described gravure-printing method for printing the conductive paste and the step-reducing ceramic paste in the process of manufacturing the multilayer ceramic capacitor, a multicolor gravure-printing method also has a problem in that a displacement occurs and high-definition multicolor printing is difficult.

SUMMARY OF THE INVENTION

In order to overcome the problems described above, preferred embodiments of the present invention provide a method for manufacturing a ceramic electronic component including a step of applying conductive paste on a sheet or step-reducing ceramic paste by gravure printing, by which the displacement is corrected with high accuracy and distortion of the step-reducing ceramic paste and the conductive paste is prevented.

A method according to a first preferred embodiment of the present invention includes a preparation step of preparing a long composite sheet including a supporting film and a ceramic green sheet disposed on the supporting film, a first gravure-printing step of applying a first paste to the ceramic green sheet in a first region of the ceramic green sheet by gravure printing, and a second gravure-printing step of applying a second paste to the ceramic green sheet in a second region of the ceramic green sheet by gravure printing, and a first print mark is formed on the ceramic green sheet or the supporting film in the first gravure-printing step. The position of the first print mark formed in the first gravure-printing step is compared with a desired position of the first print mark, and the second gravure-printing step is performed in accordance with the result of the comparison.

As described above, according to the first preferred embodiment of the present invention, the position of the first print mark which is formed in the first gravure-printing step is compared with the desired position of the first print mark after the first gravure-printing step, and the second gravure-printing step is performed in accordance with the result of the comparison. Therefore, when the first and the second pastes are applied to the ceramic green sheet or the supporting film in the first and the second gravure-printing steps, respectively, print patterns formed in the second gravure-printing step are positioned with high accuracy with respect to print patterns formed in the first gravure-printing step.

In the method for manufacturing the ceramic electronic component according to the first preferred embodiment of the present invention, the second gravure-printing step is performed after the ceramic green sheet is moved along the width and/or the length thereof in accordance with the result of the comparison or while the ceramic green sheet is being moved along the width and/or the length thereof in accordance with the result of the comparison.

When the second gravure-printing step is performed after the ceramic green sheet is moved or while it is being moved along the width and/or the length in accordance with the difference between the position at which the first print mark is formed and the desired position of the first print mark, print patterns formed in the second gravure-printing step are positioned with high accuracy with respect to print patterns formed in the first gravure-printing step.

In addition, in the method for manufacturing the ceramic electronic component according to the first preferred embodiment of the present invention, a first imaging device and a first image-processing device are preferably used for determining the position of the first print mark. In this manner, the position of the first print mark is determined with high accuracy.

In addition, in the method for manufacturing the ceramic electronic component according to the first preferred embodiment of the present invention, a second print mark is preferably formed on the ceramic green sheet or the supporting film in the second gravure-printing step. In this manner, the positions of the first and the second print marks formed in the first and the second gravure-printing steps, respectively, are compared with desired positions of the first and the second print marks, and the second gravure-printing step is repeated in accordance with the result of the comparison.

In such a case, the position of the ceramic green sheet is adjusted by feedforward control after the first gravure-printing step, and then the positions of the first and the second print marks are adjusted with high accuracy by feedback control after the second gravure-printing step on the basis of the actual positions of the first and the second print marks. Accordingly, the first and the second gravure-printing steps are performed with higher accuracy.

In addition, in the method for manufacturing the ceramic electronic component according to the first preferred embodiment of the present invention, a second print-mark-printing element provided on a plate cylinder used in the second gravure-printing step is preferably detected for determining the position of the second print mark.

When the position of the second print mark formed on the ceramic green sheet or the supporting film is determined by detecting the second print-mark-printing element provided on a plate cylinder used in the second gravure-printing step and the first or the second gravure-printing step is performed in accordance with the result of comparison between the desired positions of the first and the second print marks and the actual positions thereof, the positions of the first and the second print marks are determined and compared with the desired positions more quickly. Therefore, the position of the ceramic green sheet is adjusted more quickly for the second gravure-printing step.

According to a second preferred embodiment of the present invention, a method for manufacturing a ceramic electronic component includes a preparation step of preparing a long composite sheet including a supporting film and a ceramic green sheet disposed on the supporting film, a first gravure-printing step of applying a first paste to the ceramic green sheet in a first region of the ceramic green sheet by gravure printing, and a second gravure-printing step of applying a second paste to the ceramic green sheet in a second region of the ceramic green sheet by gravure printing, and a first print mark is formed on the ceramic green sheet or the supporting film in the first gravure-printing step. The transit time of the first print mark formed in the first gravure-printing step is compared with a desired transit time of the first print mark, and the second gravure-printing step is performed in accordance with the result of the comparison.

As described above, according to the second preferred embodiment of the present invention, the transit time of the first print mark formed in the first gravure-printing step is compared with the desired transit time of the first print mark and the second gravure-printing step is performed in accordance with the result of the comparison. Therefore, similar to the first preferred embodiment of the present invention, the print patterns formed in the second gravure-printing step are positioned with high accuracy with respect to the print patterns formed in the first gravure-printing step.

In the method for manufacturing the ceramic electronic component according to the second preferred embodiment of the present invention, the second gravure-printing step is performed after the ceramic green sheet is moved along the width and/or the length thereof in accordance with the result of the comparison or while the ceramic green sheet is being moved along the width and/or the length thereof in accordance with the result of the comparison.

When the second gravure-printing step is performed after the ceramic green sheet is moved or while it is being moved along the width and/or the length in accordance with the difference between the actual transit time of the first print mark and the desired transit time thereof such that the second print mark is printed after the first print mark with a time difference between the desired transit time of the first print mark and that of the second print mark, the print patterns formed in the second gravure-printing step is positioned with high accuracy with respect to the print patterns formed in the first gravure-printing step.

In addition, in the method for manufacturing the ceramic electronic component according to the second preferred embodiment of the present invention, a first sensor and a first measuring device are preferably used for determining the transit time of the first print mark. In this manner, the transit time of the first print mark is determined with high accuracy.

In addition, in the method for manufacturing the ceramic electronic component according to the second preferred embodiment of the present invention, a second print mark is preferably formed on the ceramic green sheet or the supporting film in the second gravure-printing step. In this manner, the transit times of the first and the second print marks formed in the first and the second gravure-printing steps, respectively, are compared with desired transit times of the first and the second print marks, and the second gravure-printing step is repeated in accordance with the result of the comparison.

In addition, in the method for manufacturing the ceramic electronic component according to the first or the second preferred embodiments of the present invention, the dimension of the first print mark and/or the second print mark along the length of the ceramic green sheet preferably changes along the width of the ceramic green sheet. In this manner, the transit times of the first and the second print marks are easily determined with a simple sensor.

In addition, in the method for manufacturing the ceramic electronic component according to the first or the second preferred embodiments of the present invention, the first paste and the second paste are a conductive paste and a step-reducing ceramic paste, respectively, or both of the first paste and the second paste are a conductive paste.

Other features, elements, characteristics, steps and advantages of the present invention will become more apparent form the following detailed description of preferred embodiments with reference to the attached drawings.

BRIEF DESCRIPTION OF THE DRAWINGS

FIGS. 15A and 15B are diagrams showing steps of determining transit times of the first print mark and the second print mark, respectively, in the second modification of preferred embodiments of the present invention;

DETAILED DESCRIPTION OF PREFERRED EMBODIMENTS

A preferred embodiment of the present invention will be described below with reference to the accompanying drawings.

Figure 4:
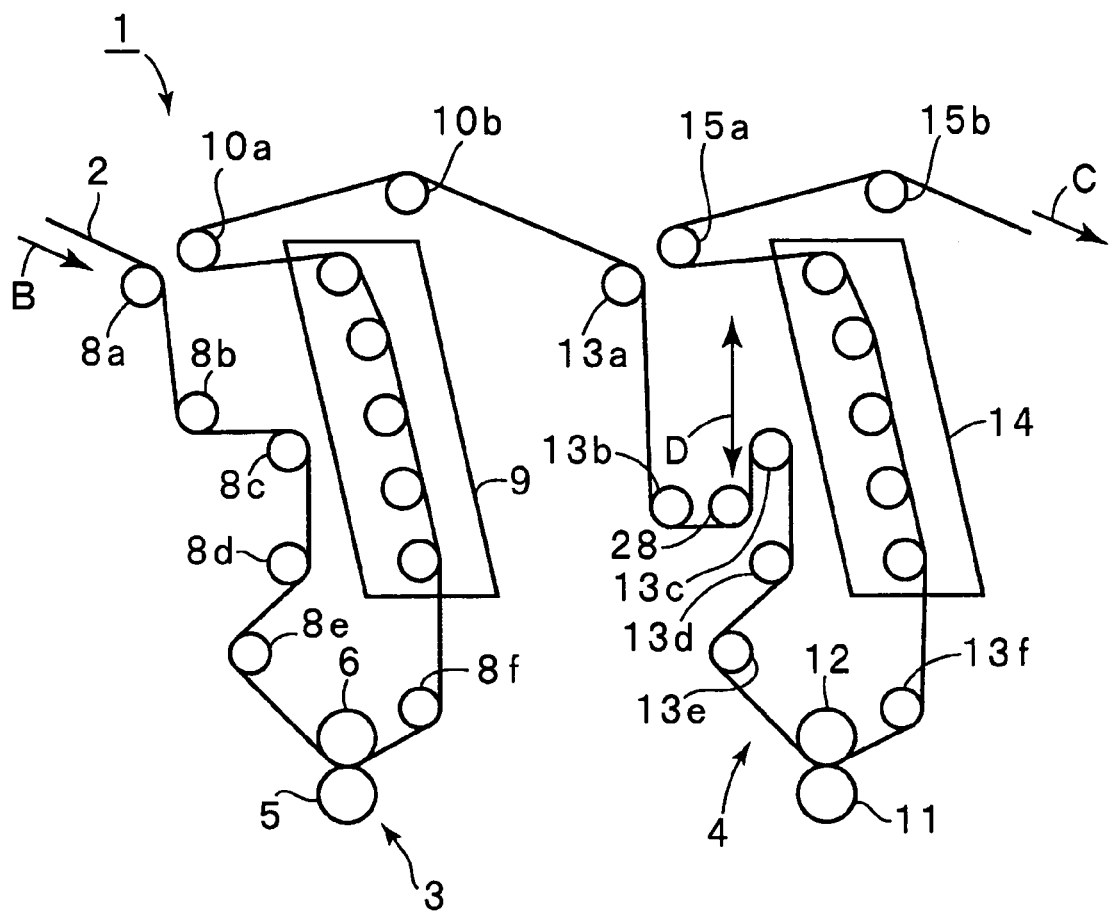
FIG. 4 is a schematic diagram showing an apparatus for performing the first and the second gravure-printing steps used in preferred embodiments of the present invention.

FIG. 4 is a schematic diagram showing a manufacturing apparatus of a multilayer ceramic capacitor according to a preferred embodiment of the present invention.

In the manufacturing apparatus 1 of the multilayer ceramic electronic component, a composite sheet 2 including a supporting film composed of a synthetic resin such as polyethylene terephthalate, polypropylene, and polyethylene naphthalate and a ceramic green sheet disposed on the supporting film is conveyed as shown by the arrow B in the figure. The manufacturing apparatus 1 of the multilayer ceramic electronic component includes first and second gravure-printing units 3 and 4 for performing first and second gravure-printing steps, respectively, in each of which one side of the composite sheet 2 is printed.

Figure 5A:
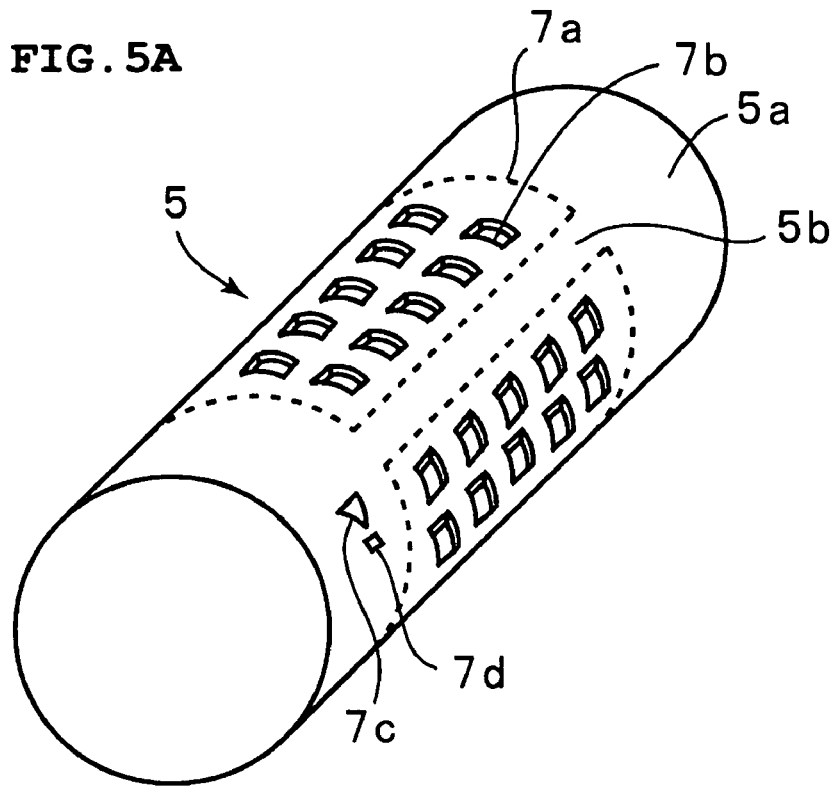
FIGS. 5A and 5B are perspective views of first and second gravure rolls, respectively.

The first gravure-printing unit 3 includes a first gravure roll 5 which defines a plate cylinder and a first impression roll 6. As shown in FIG. 5A, which is a perspective view of the gravure roll 5, the gravure roll 5 is cylindrical and includes a first print section 7a provided along the external circumference 5a of the gravure roll 5 and a predetermined gap 5b which extends along the axis of the gravure roll 5. In order to print conductive paste on the ceramic green sheet and form internal electrodes, a plurality of substantially rectangular recesses 7b are arranged in the print section 7a in a matrix pattern such that they extend substantially parallel to the rotating direction of the gravure roll 5. Each of the recesses 7b includes a plurality of cells (not shown), each cell being surrounded by a substantially rectangular wall. The shape of the recesses 7b corresponds to that of electrodes required in the multilayer ceramic electronic component, and is not limited to being substantially rectangular. Although only one print section 7a is shown in FIG. 5A, two or more print sections may also be provided.

In addition to the first print section 7a, a first print-mark-printing element 7c which prints a first print mark used for correcting a displacement of the composite sheet along the conveying direction thereof, which will be described below, is also provided on the external circumference 5a of the first gravure roll 5. The shape of the print-mark-printing element 7c is not particularly limited. In addition, a first trigger-mark-printing element 7d is provided in front of the print-mark-printing element 7c in the print direction.

In the first gravure printing step, the composite sheet 2 passes between the gravure roll 5 and the impression roll 6 of the first gravure-printing unit 3, and the conductive paste (first paste) supplied in the recesses 7b in the print section 7a by a conductive-paste supplier (not shown) is transferred onto the composite sheet 2. The conductive paste is obtained by mixing conductive powder made of, for example, Ag, Ag—Pd, Ni, Cu, Au, or other suitable conductive powders with an organic vehicle.

The first gravure-printing unit 3 also includes rollers 8a to 8e which are arranged to feed the composite sheet 2 to the position between the gravure roll 5 and the impression roll 6, and the composite sheet 2 is conveyed to the position between the gravure roll 5 and the impression roll 6 via the rollers 8a to 8e. In addition, a roller 8f is provided behind the gravure roll 5, and the composite sheet 2 on which the conductive paste is printed is conveyed to a first drying device 9 via the roller 8f. The drying device 9 includes a suitable heater, and is provided for drying the conductive paste printed on the composite sheet 2.

In addition, rollers 10a and 10b are provided downstream of the drying device 9, and the composite sheet 2 is fed to the second gravure-printing unit 4 after the conductive paste is dried. The second gravure-printing unit 4 includes a second gravure roll 11 and a second impression roll 12 for performing gravure printing.

Figure 5B:
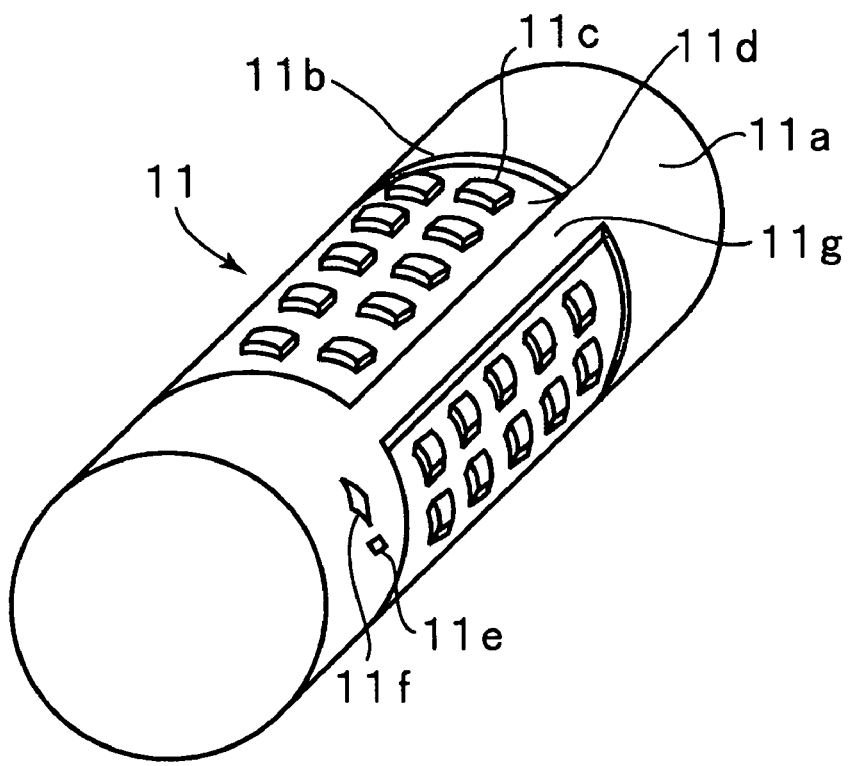

As shown in FIG. 5B, similar to the first gravure roll 5, the second gravure roll 11 is substantially cylindrical and includes a second print section 11b provided along the external circumference 11a of the second gravure roll 11 and a predetermined gap 11g which extend along the axis of the second gravure roll 11.

In order to print step-reducing ceramic paste on the composite sheet 2 at regions where the conductive paste is not printed, the print section 11b includes a plurality of projections 11c having approximately the same shape as the printed conductive paste at positions corresponding to the printed conductive paste and a grid-shaped groove 11d which surrounds the projections 11c and into which the step-reducing ceramic paste is supplied. Although only one print section 11b is shown in FIG. 5B, two or more print sections may also be provided.

Similar to the first gravure roll 5, in addition to the second print section 11b, a second print-mark-printing element 11f which prints a second print mark used for correcting the displacement of the composite sheet along the conveying direction thereof is also provided on the external circumference 11a of the second gravure roll 11. The shape of the print-mark-printing element 11f is not particularly limited. In addition, a second trigger-mark-printing element 11e is provided in front of the second print-mark-printing element 11f in the print direction.

In the second gravure printing step for eliminating the steps, the composite sheet 2 on which the conductive paste is printed passes between the gravure roll 11 and the impression roll 12 of the second gravure-printing unit 4, and the step-reducing ceramic paste (second paste) supplied in the groove 11d in the print section 11b by a step-reducing-paste supplier (not shown) is transferred onto the composite sheet 2. The step-reducing ceramic paste is obtained by mixing ceramic powder of, for example, dielectric ceramic, magnetic ceramic, glass, glass ceramic, or other suitable ceramic powders with an organic vehicle.

Rollers 13a to 13e and a compensator roll 28 are arranged to feed the composite sheet 2 to the position between the gravure roll 11 and the impression roll 12.

The compensator roll 28 is configured so as to move in a direction shown by the arrow D in FIG. 4, and the position of the ceramic green sheet along its length is controlled by moving the compensator roll 28. In addition, a roller 13f and a second drying device 14 are disposed downstream of the gravure roll 11. The construction of the second drying device 14 is similar to that of the first drying device 9. The second drying device 14 includes a heater suitable for drying the step-reducing ceramic paste applied by the second gravure roll 11.

In addition, rollers 15a and 15b are provided downstream of the second drying device 14, and the composite sheet 2 which is subjected to the printing processes performed by the first and the second gravure printing portions 3 and 4 is output along a direction shown by the arrow C.

Figure 6:
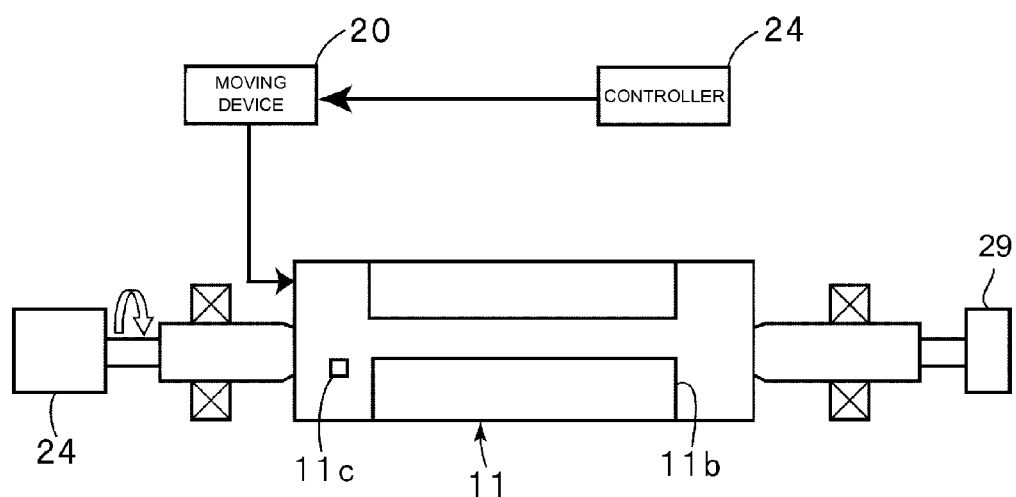
FIG. 6 is a schematic diagram showing a device for moving the second gravure roll along its axis according to preferred embodiments of the present invention.

As shown in FIG. 6, according to the preferred embodiment of the present embodiment, the second gravure roll 11 is connected to a moving device 20 which moves the gravure roll 11 along its axis for correcting the displacement between the conductive paste printed by the first gravure-printing unit 3 and the step-reducing ceramic paste printed by the second gravure-printing unit 4 in the width direction (direction perpendicular to the conveying direction of the composite sheet). Although not shown in FIG. 6, the moving device 20 includes a reciprocating drive source 29 which moves the gravure roll 11 by a desired distance along its axis in accordance with a signal input from a controller 24. The reciprocating drive source 29 may be a reciprocating drive device such as an air cylinder and a hydraulic cylinder or a reciprocating drive mechanism obtained by combining a motor and a rack-and-pinion system.

Figure 2:
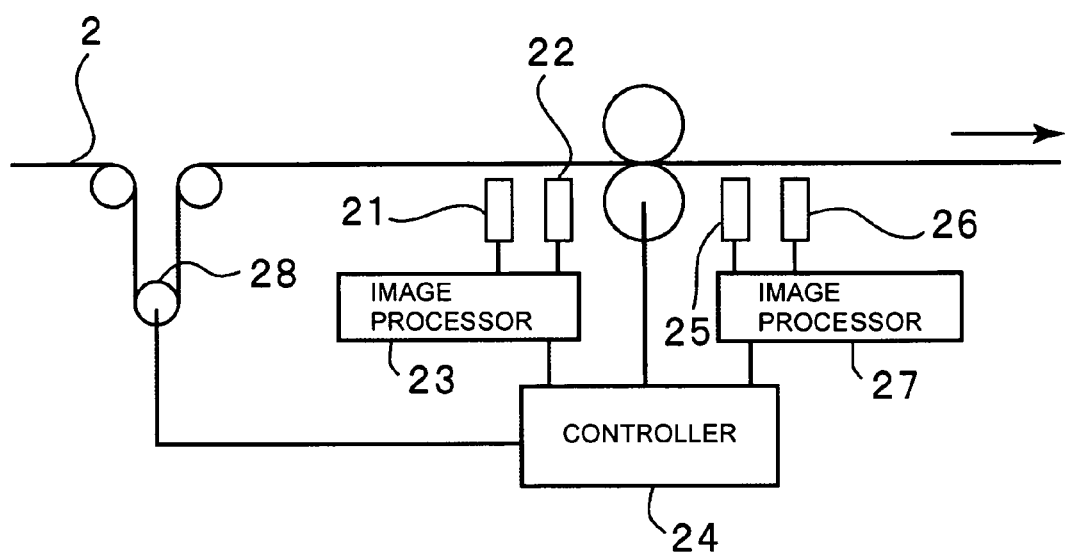
FIG. 2 is a schematic diagram showing a device for determining the positions of the first and the second print marks according to a preferred embodiment of the present invention.
Figure 3:
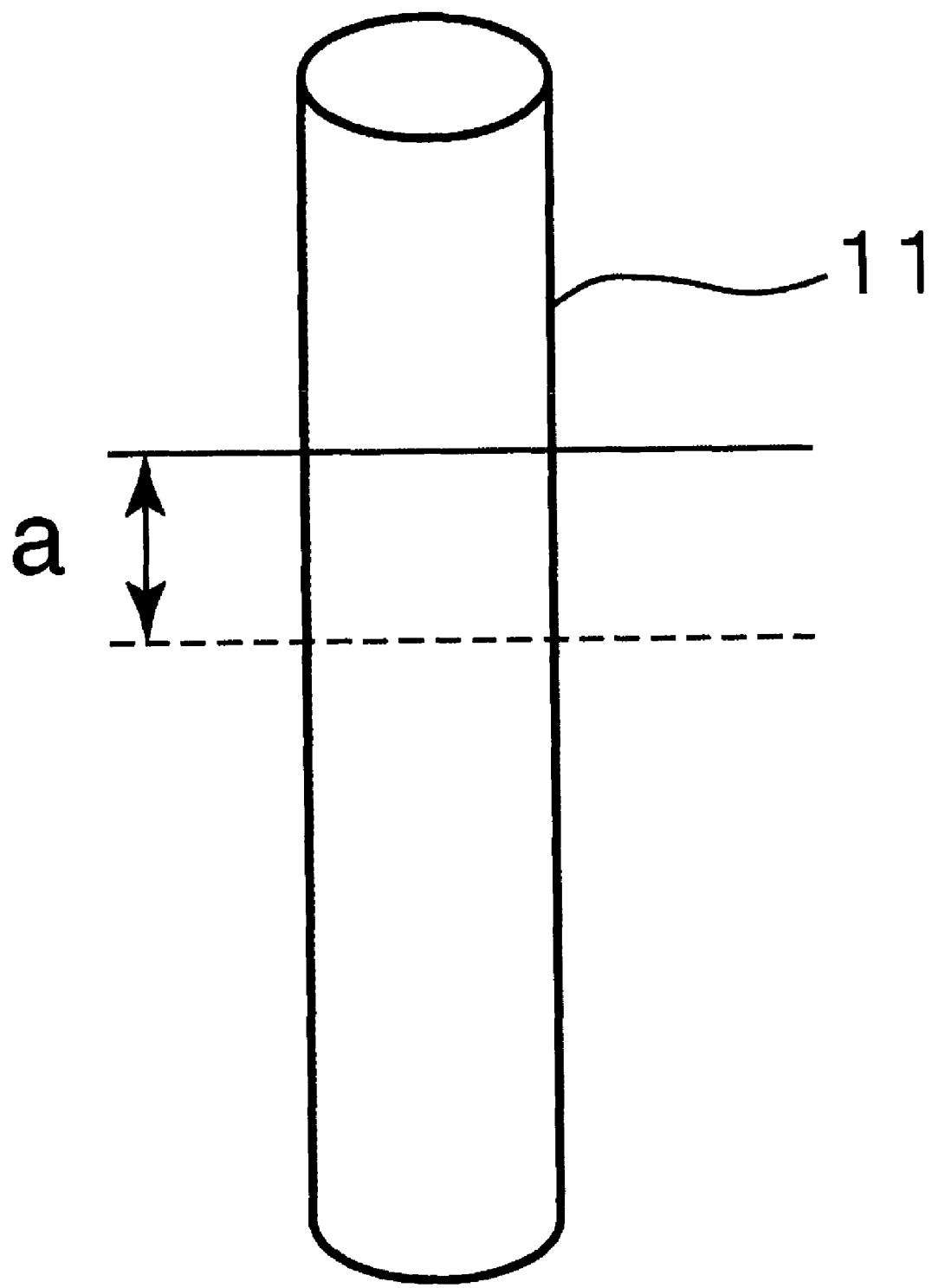
FIG. 3 is a schematic perspective view showing displacement of a second gravure roll along its axis.

FIG. 2 is a schematic diagram showing the main portion of a system for controlling the position of the gravure roll 11 along its axis and the position of the composite sheet 2 along its length according to the present preferred embodiment. As shown in FIG. 2, a trigger sensor 21 and a first camera 22 are disposed in front of the second gravure roll 11. The trigger sensor 21 is provided for detecting a first trigger mark, and the camera 22 is provided for photographing a first print mark. The trigger sensor 21 and the first camera 22 are connected to a first image processor 23, and the first image processor 23 is connected to the controller 24.

When the trigger mark is detected by the trigger sensor 21, the controller 24 outputs a command to photograph the first print mark to the camera 22. Then, an image of the first print mark obtained by the camera 22 is processed by the image processor 23, and a signal indicating the position of the first print mark is input to the controller 24.

In addition, a trigger sensor 25, a second camera 26, and a second image processor 27 are disposed downstream of the second gravure roll 11. The trigger sensor 25 is provided for detecting a second trigger mark printed by the second gravure roll 11, and the camera 26 is provided for photographing a second print mark. The image processor 27 is connected to the controller 24. When the controller 24 receives a signal indicating that the second trigger mark is detected by the trigger sensor 25 after the second gravure-printing step, the controller 24 drives the second camera 26 such that it photographs the second print mark. An image photographed by the second camera 26 is processes by the image processor 27, and a signal indicating the position of the second print mark is input to the controller 24.

The controller 24 stores desired positions of the first and the second print marks, that is, desired positions of the ceramic green sheet along its length and width.

Next, a method for manufacturing a multilayer ceramic electronic component according to a preferred embodiment the present embodiment will be described below with reference to FIGS. 1A to 1C and FIG. 3 in addition to the above-mentioned drawings.

Figure 1A:
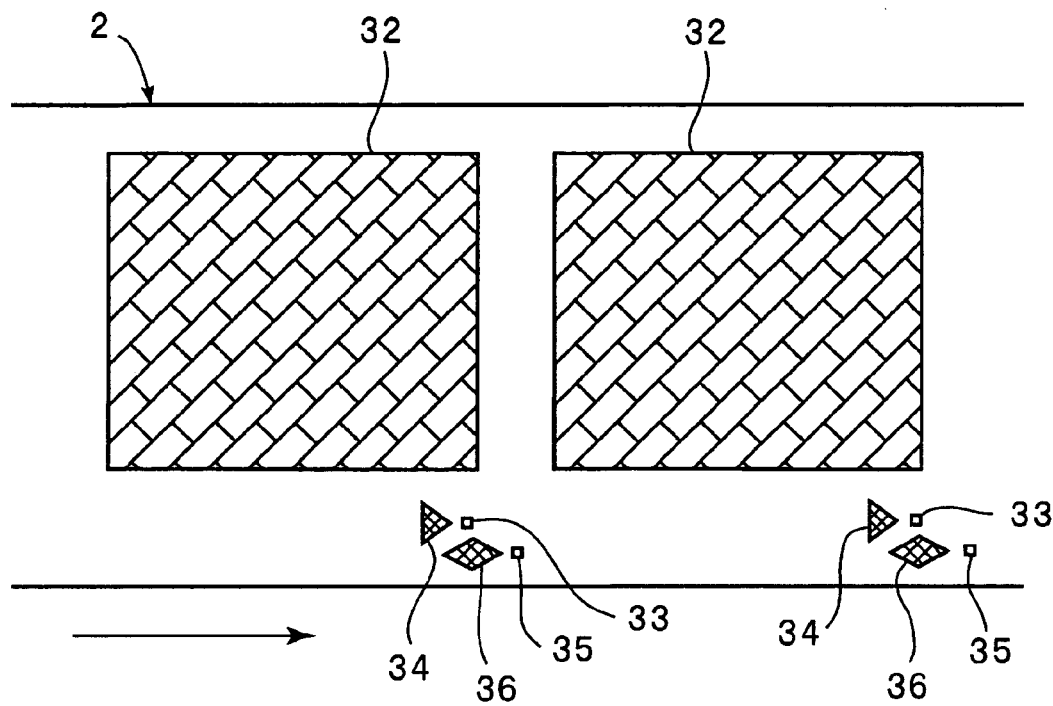
FIG. 1A is a schematic plan view showing print patterns and first and second print marks printed in first and second gravure-printing steps.

FIG. 1A is a schematic plan view of the composite sheet 2 after the first and the second gravure-printing steps are performed. In FIG. 1A, the width of the supporting film (dimension in a direction perpendicular to the arrow shown in the figure) is approximately the same as the width of the ceramic green sheet. However, the width of the ceramic green sheet may also be less than that of the supporting film such that the supporting film protrudes from the ceramic green sheet at both sides thereof. In such a case, the first and the second trigger marks and the first and the second print marks may also be printed on the supporting film.

Figure 1B:
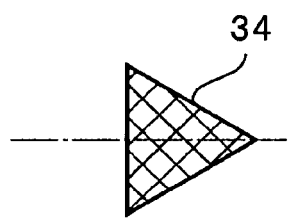
FIG. 1B is a schematic plan view showing the first print mark.

The first trigger mark 33 and the first print mark 34 are printed in the first gravure-printing step. As shown in FIG. 1B, only the first print mark 34 of the two print marks is printed after the first gravure-printing step. The second trigger mark 35 and the second print mark 36 are printed in the second gravure-printing step.

As shown in FIG. 2, in the present preferred embodiment, the position of the first print mark 34 is determined by the image processor 23 after the first gravure-printing step and before the second gravure-printing step. More specifically, when the first trigger mark 33 is detected by the trigger sensor 21, the controller 24 drives the first camera 22 such that it photographs the first print mark 34. Then, the actual position of the first print mark 34 is input to the controller 24.

Figure 1C:
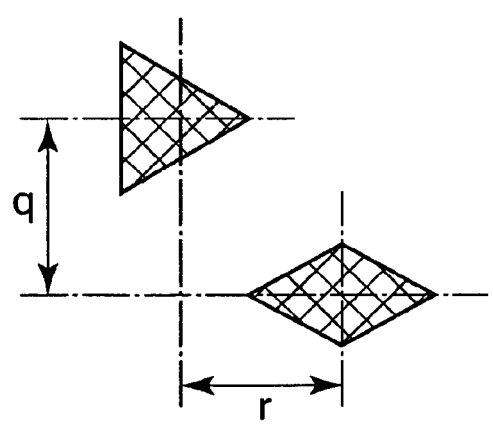
FIG. 1C is a schematic plan view showing the relationship between the first and the second print marks.

The controller 24 calculates the difference between the actual position of the first print mark 34 which is determined as described above and the desired position thereof which is stored in the controller 24 in advance, and moves the composite sheet 2 on the basis of the calculated difference such that the distances q and r between the first and the second print marks 34 and 36 along the width and the length, respectively, shown in FIG. 1C become the same as desired distances Q and R, respectively. The movement of the composite sheet 2 is achieved by the above-described moving device 20 and the compensator roll 28. More specifically, the movement along the width of the ceramic green sheet is achieved by the above-described moving device 20 and the movement along the length thereof is achieved by adjusting the position of the compensator roll 28 so as to eliminate the difference along the length.

Accordingly, the composite sheet is moved such that the positional relationship between the first and the second print marks is optimized before the second gravure-printing step is performed. More specifically, even when the first print mark is displaced from the desired position, the second mark is printed at an accurate position with respect to the first print mark. Therefore, in the second gravure-printing step which is performed afterwards, print patterns are formed at desired positions with high accuracy with respect to print patterns formed in the first gravure-printing step. More specifically, the displacements between the print patterns formed in the first gravure-printing step and those formed in the second gravure-printing step are reliably prevented.

Although the ceramic green sheet is moved by the moving device 20 and the compensator roll 28 before the second gravure-printing step in the present preferred embodiment, it may also be moved during the second gravure-printing step. More specifically, the ceramic green sheet may be moved in the middle of the second gravure printing such that the accuracy is increased in the second gravure-printing step which is performed afterwards. In particular, in the case in which a plurality of print patterns are printed along the length in the second gravure-printing step, distortion of the print patterns printed in the second gravure-printing step is prevented by moving the ceramic green sheet within the regions between the print patterns.

In the present preferred embodiment, however, the second gravure-printing step using the gravure roll 11 is performed after the ceramic green sheet is moved.

In the second gravure-printing step, the second trigger mark 35 and the second print mark 36 shown in FIG. 1A are printed. When the second trigger mark 35 is detected by the trigger sensor 25 at a position downstream of the second gravure roll 11, the controller 24 drives the camera 26 such that it photographs the second print mark 36. Then, the position of the second print mark 36 is determined by the image processor 27, and is input to the controller 24.

The desired position of the second print mark 36 is stored in the controller 24 in advance. The controller 24 compares the positions of the first and the second print marks which are actually printed in the first and the second gravure-printing steps, respectively, with the desired positions of the first and the second print marks stored in the controller 24, and moves the ceramic green sheet so as to eliminate the differences therebetween.

Since the ceramic green sheet is moved after the second gravure-printing step so as to eliminate the differences between the positions of the first and the second print marks which are actually printed and the desired positions of the first and the second print marks stored in advance, the accuracy in the first and the second gravure-printing steps performed afterwards is greatly increased. In the present invention, however, the feedback control using the second print mark is not necessary, and only the feedforward control using the first print mark may be performed.

Figure 7:
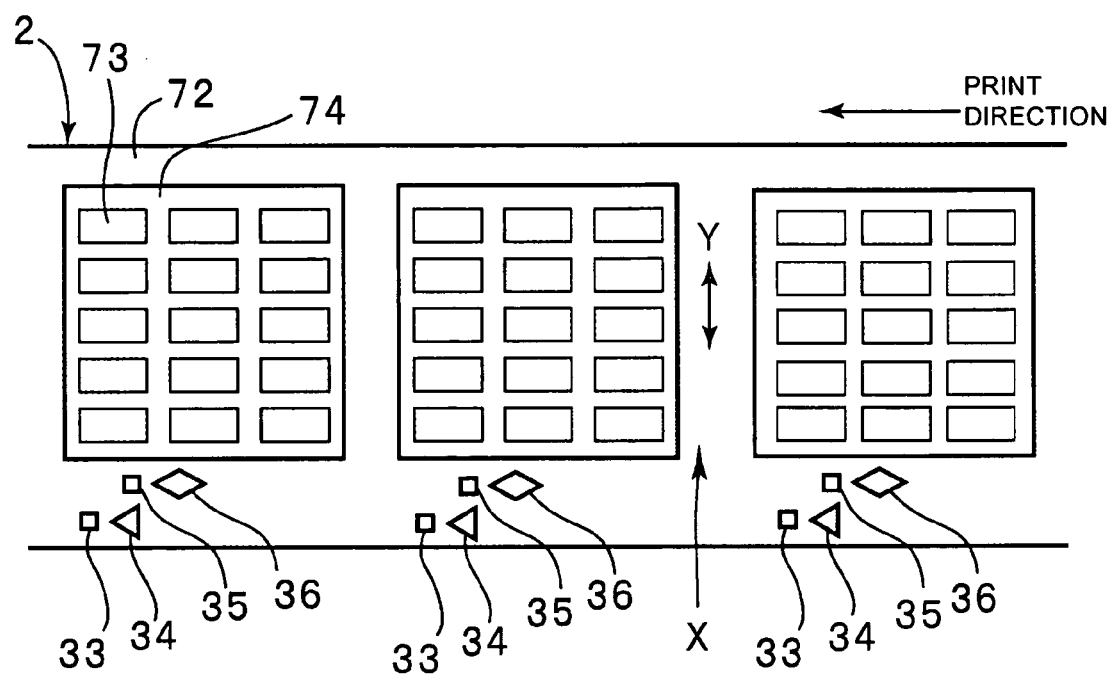
FIG. 7 is a schematic plan view showing the state after a ceramic green sheet disposed on a supporting film is subjected to the first and the second gravure-printing steps according to preferred embodiments of the present invention.
Figure 8:
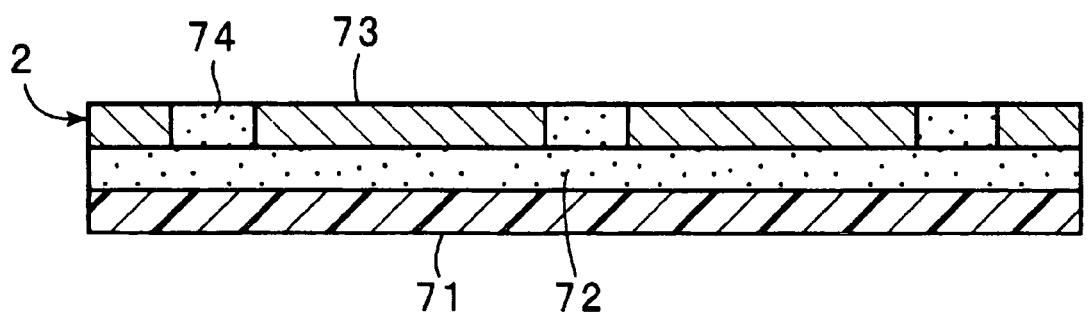
FIG. 8 is a schematic sectional view showing the state after conductive paste and step-reducing ceramic paste are printed on the ceramic green sheet disposed on the supporting film in the first and the second gravure-printing steps according to preferred embodiments of the present invention.

In the present preferred embodiment, the distances between the first and the second print marks 34 and 36 along the width and the length are accurately adjusted to the desired distances Q and R, respectively, by moving the gravure roll 11 along the width of the ceramic green sheet with the moving device 20 and adjusting the position of the compensator roll 28. Accordingly, as shown in FIGS. 7 and 8, in the second gravure-printing step, the print patterns are printed at accurate positions with respect to the print patterns formed in the first gravure-printing step. In other words, the conductive paste and the step-reducing ceramic paste are accurately printed such that they do not overlap each other.

As shown in FIG. 8, in the composite sheet 2 which is subjected to the above-described first and second gravure-printing steps, a ceramic green sheet 72 is formed on a supporting film 71. In addition, internal electrodes 73 are formed on the ceramic green sheet 72 in the first gravure-printing step, and a step-reducing ceramic member 74 is formed in the second gravure-printing step. Although the internal electrodes 73 and the step-reducing ceramic member 74 are arranged without gaps therebetween in FIG. 8, predetermined gaps may also be provided between the internal electrodes 73 and the step-reducing ceramic member 74. Alternatively, the step-reducing ceramic member 74 may also be arranged such that it overlaps the internal electrodes 73 at the peripheral edges of the internal electrodes 73 by a desired width.

Figure 9A:
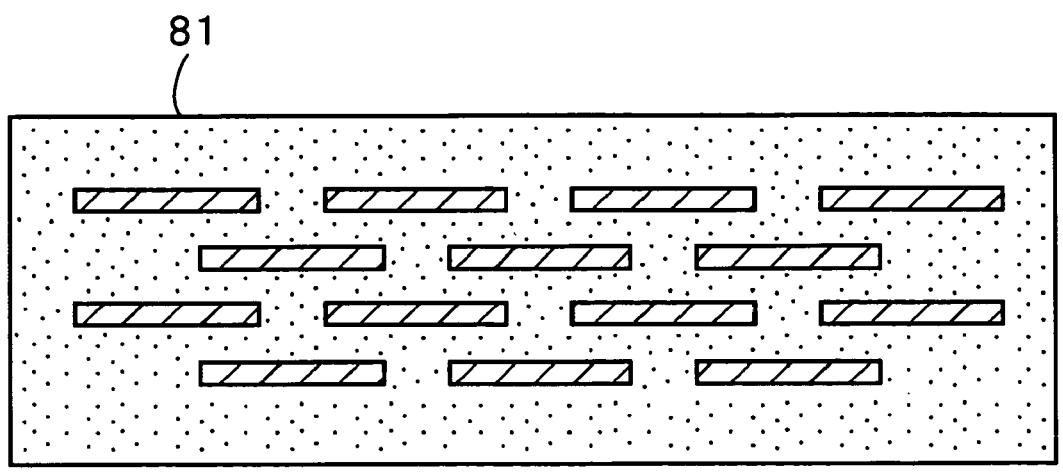
FIG. 9A is a sectional view of a mother laminate obtained in preferred embodiments of the present invention.

The long composite sheet 2 is cut by a culling head (not shown) such that a film element including the ceramic green sheet 72, the internal electrodes 73, and the step-reducing ceramic member 74 is separated from the supporting film 71. Then, a plurality of film elements obtained as described above are laminated on a lamination stage or in the cutting head, such that a mother laminate 81 shown in FIG. 9A is obtained. In the mother laminate 81, a plain ceramic green sheet is provided at the bottom. In addition, another plain ceramic green sheet may also be provided on the top.

In addition, the mother laminate 81 may also be formed by repeating processes of culling the long composite sheet 2 along the print section such that a card-shaped sheet element is obtained, pressing the card-shaped sheet element onto a plain ceramic green sheet placed on a lamination stage such that the supporting film 71 faces upward, and removing the supporting film.

Figure 9B:
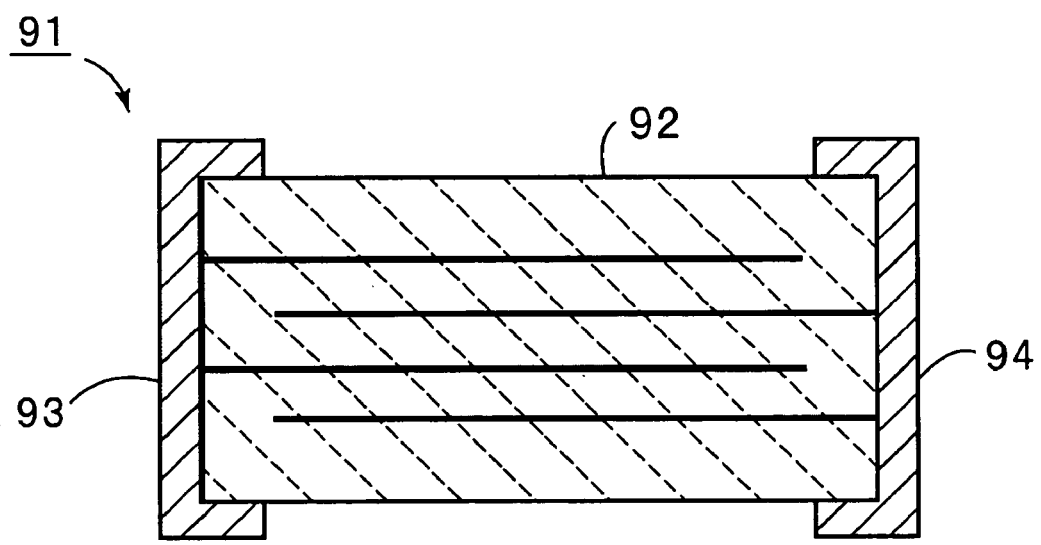
FIG. 9B is a sectional view of a multilayer ceramic capacitor obtained in preferred embodiments of the present invention.

Then, laminate units are obtained by cutting the mother laminate 81 along its thickness, each laminate unit being used in a single multilayer ceramic capacitor, and a sintered ceramic component 92 shown in FIG. 9B is obtained by sintering each of the laminate units. Then, a multilayer ceramic capacitor 91 is obtained by forming external electrodes 93 and 94 on the ends of the sintered ceramic component 92. The laminate unit and the external electrodes 93 and 94 may also be sintered simultaneously.

In the manufacturing method of the multilayer ceramic capacitor 91, the conductive paste and the step-reducing ceramic paste are printed as described in the above preferred embodiment. Therefore, displacements between the conductive paste and the step-reducing ceramic paste are greatly reduced and the steps around the conductive-paste elements are eliminated.

Therefore, structural defects of the sintered components, such as delamination, do not occur and the defect rate is effectively reduced.

In addition, the present invention may be applied not only to the multilayer ceramic capacitor, but also to various multilayer ceramic electronic components such as a multilayer inductor, a multilayer noise filter, a multilayer LC filter, and a multilayer composite module. In such cases, circuit elements can be obtained by forming via holes in the ceramic green sheet and connecting the planar internal electrode patterns.

First Modification of Preferred Embodiments

A method for manufacturing a multilayer ceramic electronic component according to a first modification of the above-described preferred embodiment will be described below with reference to FIGS. 10 to 12. The constructions of the first modification and second and third modifications, which will be described below, are similar to that of the above-described preferred embodiment except for the structure for determining the position of the second print mark after the second gravure-printing step. Therefore, only differences between the above-described preferred embodiment and the modifications will be described below and explanations of constructions similar to that of the above-described preferred embodiment are omitted.

Figure 10:
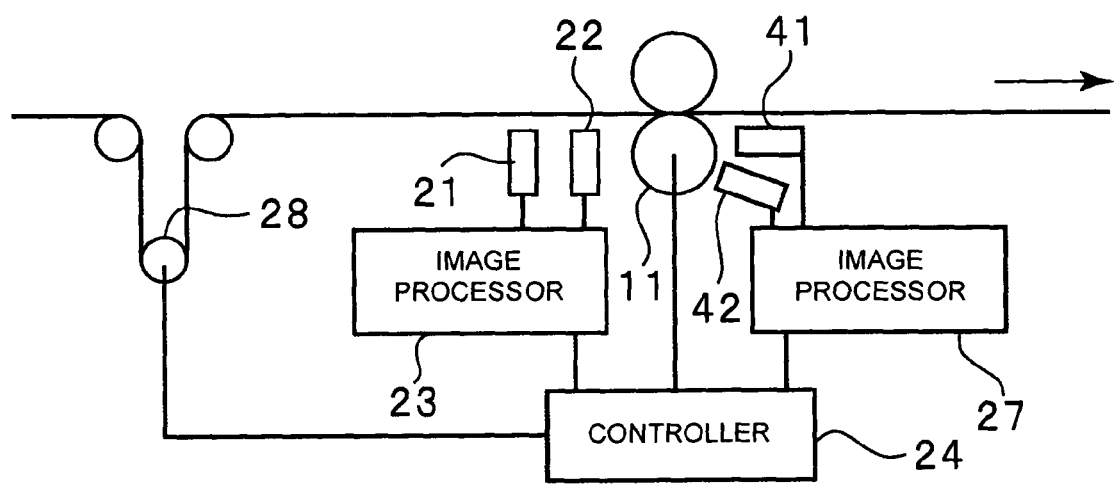
FIG. 10 is a schematic diagram showing a device for determining the positions of first and second print marks according to a first modification of preferred embodiments of the present invention.

As shown in FIG. 10, a trigger sensor 41 and a camera 42 are connected to the image processor 27. The trigger sensor 41 is provided for detecting the trigger-mark-printing element 11e on the second gravure roll 11, and the camera 42 is provided for photographing the second print-mark-printing element 11f on the second gravure roll 11. More specifically, in the present modification, the position of the second print-mark-printing element 11f is determined using the trigger-mark-printing element 11e and the second print-mark-printing element 11f instead of using the second trigger mark and the second print mark printed on the composite sheet. Then, the position of the second print-mark-printing element 11f is input to the controller 24.

Also in the present modification, the controller 24 stores desired positions of the first and the second print marks.

Figure 11:
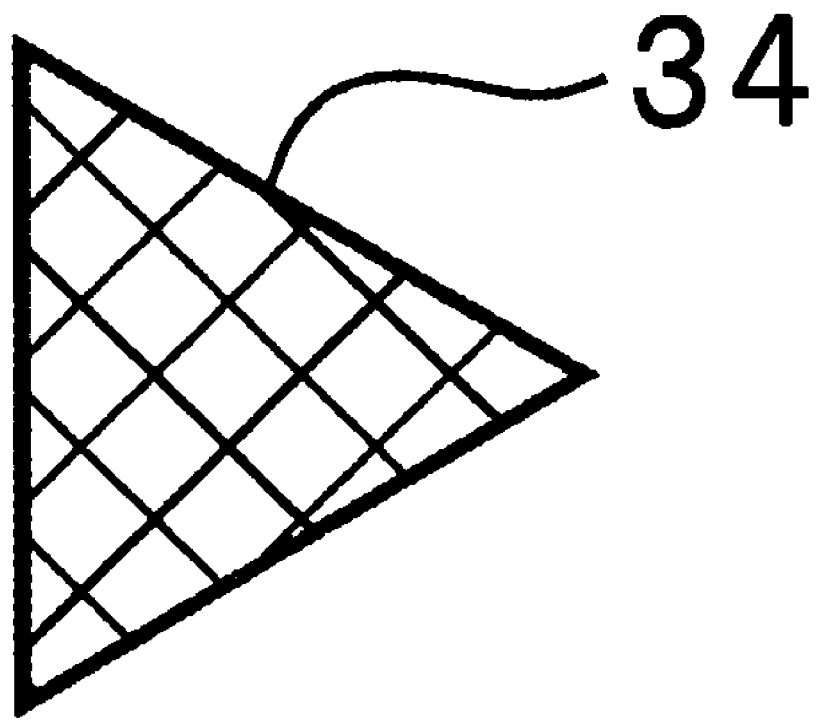
FIG. 11 is a schematic plan view of the first print mark printed in the first modification of preferred embodiments of the present invention.

In the present modification, the first print mark 34 is printed on the composite sheet, as shown in FIG. 11, and the position of the first print mark 34 is input to the controller 24 as in the above-described preferred embodiment.

Similar to the above-described preferred embodiment, the controller 24 moves the ceramic green sheet such that the second print mark is printed at a position where the distances between the first and the second print marks along the width and the length are Q and R, respectively, on the basis of the position of the first print mark 34 which is actually printed. Accordingly, the ceramic green sheet is moved to a suitable position before the second gravure-printing step. Therefore, in the present modification, even when print patterns printed in the first gravure-printing step are displaced, print patterns printed in the second gravure-printing step are accurately positioned with respect to the print patterns printed in the first gravure-printing step.

Figure 12:
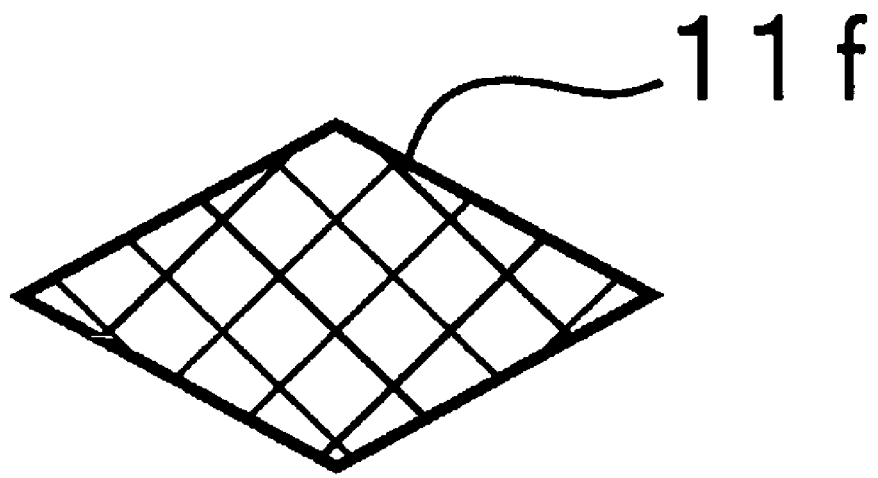
FIG. 12 is a schematic plan view of the second print mark printed in the first modification of preferred embodiments of the present invention.

Next, when the trigger sensor 41 detects the second trigger-mark-printing element 11e in the second gravure-printing step, the second print-mark-printing element 11f shown in FIG. 12 is photographed by the camera 42 and the position information thereof is input to the controller 24. In addition, the time at which the second print-mark-printing element 11f is photographed is also input to the controller 24. The controller 24 calculates the position of the second print mark on the basis of the received position information and the time.

In the present modification, similar to the above-described preferred embodiment, the ceramic green sheet is moved so as to eliminate the differences between the desired positions of the first and second print marks which are stored in the controller 24 in advance and the positions of the first and second print marks which are actually printed before the second gravure-printing step is performed.

Accordingly, in the second gravure-printing step, the print patterns are printed at accurate positions with respect to the print patterns printed in the first gravure-printing step.

In addition, since the positions of the second trigger mark and the second print mark are determined using the trigger-mark printing element 11e and second print-mark-printing element 11f provided on the second gravure roll 11 instead of using the second trigger mark and the second print mark printed on the composite sheet, the image process is performed irrespective of the material of the second trigger mark and the second print mark.

For example, when the second trigger mark and the second print mark are composed of the same ceramic material as the ceramic green sheet in the composite sheet, the image process of the second trigger mark and the second print mark printed on the composite sheet is often difficult. However, when the image process of the trigger-mark-printing element 11e and the second print-mark-printing element 11f is performed, the comparison between the second gravure roll 11 and the trigger-mark-printing element 11e and between the second gravure roll 11 and the second print-mark-printing element 11f is performed irrespective of the material of the trigger mark and the print mark.

The positions of the trigger-mark-printing element 11e and the second print-mark-printing element 11f and the positions of the second trigger mark and the second print mark printed on the composite sheet are the same unless displacement occurs due to sliding between the second gravure roll 11 and the composite sheet Second Preferred Modification A second modification of the above-described preferred embodiment will be described below with reference to FIGS. 13 to 16. In the second modification, as shown in FIG. 14, which is a plan view of the composite sheet after the second gravure-printing step, a first print mark 51 and a second print mark 52 are printed outside the print area after the first and the second gravure-printing steps.

The dimensions of the first and the second print marks 51 and 52 along the length of the composite sheet 2 change depending on the position along the width of the composite sheet 2. More specifically, the dimensions of the first and the second print marks 51 and 52 along the length of the composite sheet 2 increases toward the center of the composite sheet 2. Accordingly, each of the first and the second print marks 51 and 52 has a substantially triangular shape with its base facing the center of the composite sheet 2.

Figure 13:
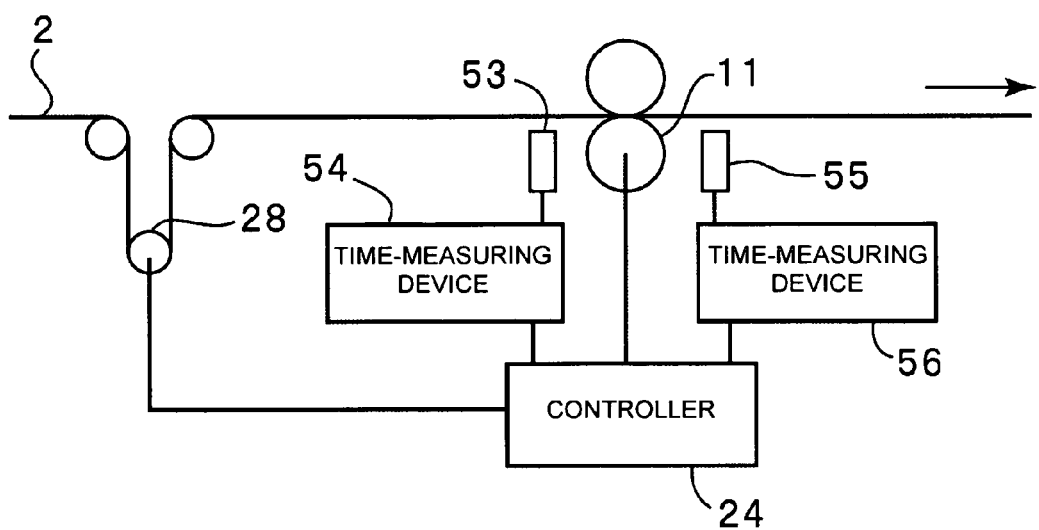
FIG. 13 is a schematic diagram showing a device for determining the positions of first and second print marks according to a second modification of preferred embodiments of the present invention.
Figure 14:
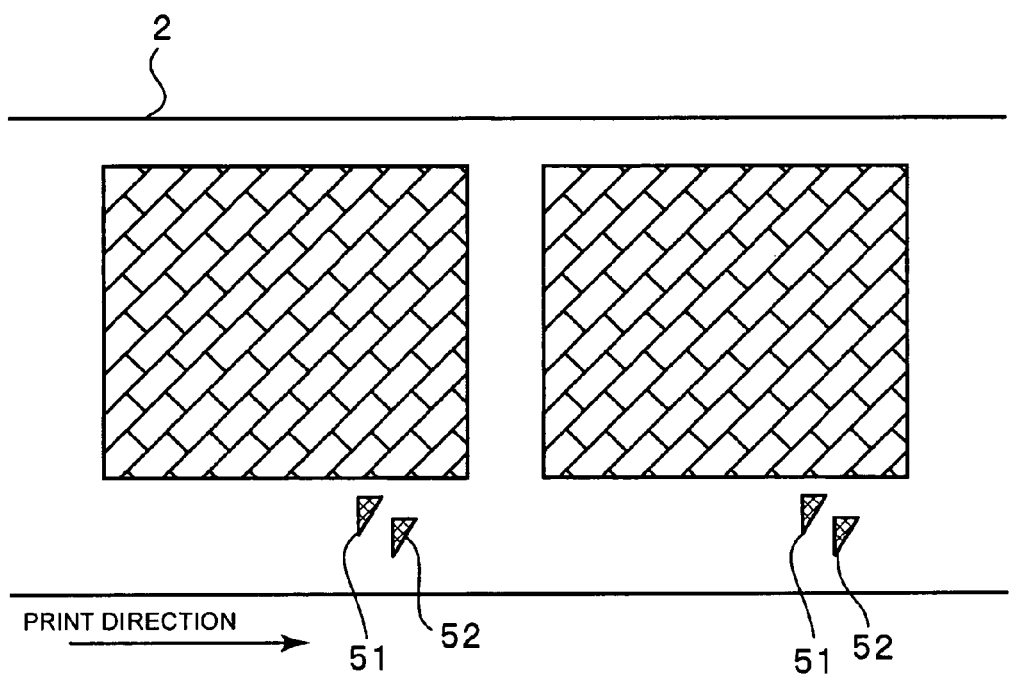
FIG. 14 is a schematic plan view showing print patterns and the first and the second print marks printed in first and second gravure-printing steps according to the second modification of preferred embodiments of the present invention.

In addition, as shown in FIG. 13, a first sensor 53 and a first time-measuring device 54 are placed in front of the second gravure roll 11. The first sensor 53 is turned on while the first print mark 51 is passing by the first sensor 53. The first time-measuring device 54 measures the time interval during which the first sensor 53 is turned on. More specifically, the first time-measuring device 54 measures the transit time of the first print mark 51, that is, the time interval during which the first print mark 51 passes by the first sensor 53, and inputs the time interval to the controller 24. In addition, the time at which the first sensor 53 is turned on is also input to the controller 24.

In addition, a second sensor 55 and a second time-measuring device 56 are disposed behind the second gravure roll 11. The second sensor 55 is constructed similarly to the first sensor 53, and is turned on while the second print mark 52 is passing by the second sensor 55. Accordingly, the controller 24 receives the transit time of the second print mark 52, that is, the time interval during which the second print mark 52 passes by the second sensor 55 from the second time-measuring device 56. In addition, the time at which the second sensor 55 is turned on is also input to the controller 24.

As described above, the dimensions of the first and the second print marks 51 and 52 along the length of the composite sheet change depending upon the position along the width of the composite sheet. Therefore, the positions of the first and the second print marks 51 and 52 along the width are determined by measuring the time intervals during which the first and the second print marks 51 and 52 pass by the first and the second sensors 53 and 55, respectively. This will be described in more detail below with reference to FIGS. 15A, 15B, and 16.

As shown in FIG. 15A, the time interval i during which the first print mark 51 passes by the first sensor 53 is obtained when the first print mark 51 passes by the first sensor 53. In addition, as shown in FIG. 15B, the time interval u is obtained and input to the controller 24 when the second print mark 52 passes by the second sensor 55. Since the first and the second print marks 51 and 52 have shapes as described above, when the controller 24 receives the time intervals i and u, the controller 24 calculates the positions of the first and the second print marks 51 and 52 along the width of the composite sheet. Then, the distance w between the first and the second print marks 51 and 52 along the width of the composite sheet is obtained on the basis of the calculation results. The controller 24 stores a desired distance between the first and second print marks 51 and 52 along the width obtained when the first and the second print marks 51 and 52 are accurately printed in the first and the second gravure-printing steps, respectively. Accordingly, the displacement along the width is reliably eliminated by moving the second gravure roll 11 with the moving device so as to eliminate the difference between the actual distance between the first and the second print marks 51 and 52 and the desired distance between them.

In addition to the displacement along the width of the ceramic green sheet, the displacement along the length thereof is also eliminated.

Figure 16:
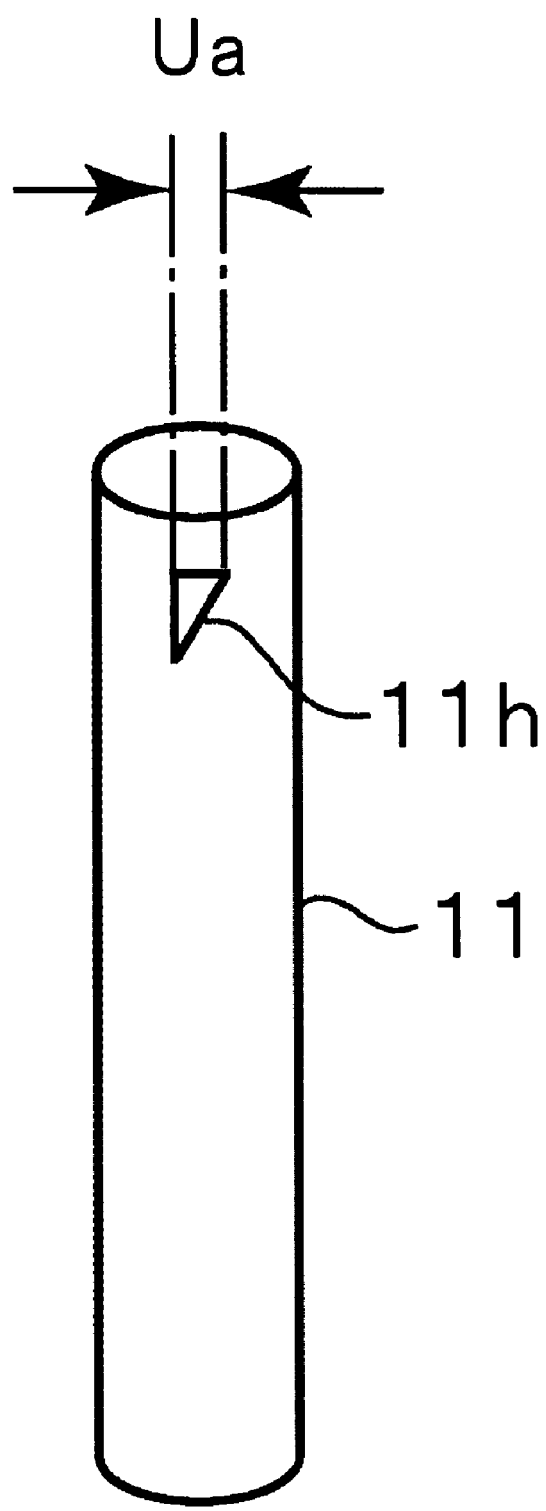
FIG. 16 is a schematic perspective view showing a step of determining a transit time of a second print-mark-printing element provided on a second gravure roll according to a third modification of preferred embodiments of the present invention.
Figure 17:
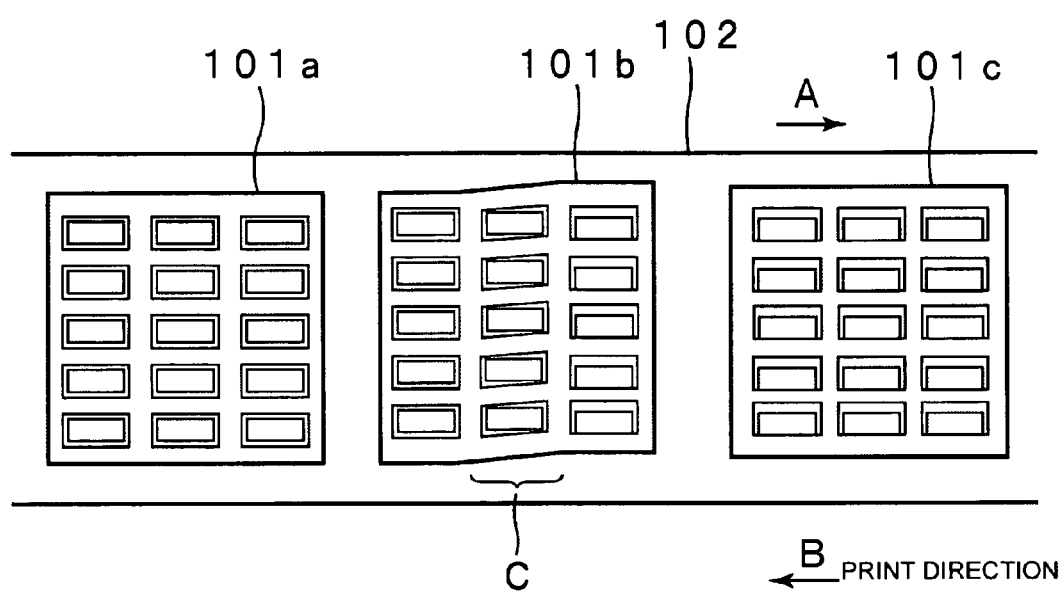
FIG. 17 is a schematic plan view showing a step of printing conductive paste and step-reducing ceramic paste in a known method for manufacturing a ceramic electronic component.

More specifically, since the times at which the measurements of the time intervals i and u are started are also detected by the sensors 53 and 55, respectively, the distance v between the print marks 51 and 52 along the length is also obtained. Accordingly, when the controller 24 stores the desired distance between the first and the second print marks 51 and 52 along the length, the position of the ceramic green sheet in the second gravure-printing step along its length is corrected by moving the compensator roll 28 by a distance corresponding to the difference between the above-described desired distance along the length and the distance between the first and second print marks 51 and 52 along the length which is obtained as described above Third Modification of Preferred Embodiments In the second modification, the second sensor 55 measures the time interval during which the second print mark 52 printed by the second gravure roll 11 passes by. However, as shown in FIG. 16, the second sensor 55 may also be arranged such that it measures a time interval Ua during which a second print-mark-printing element 11*h* provided on the gravure roll 11 passes by. In such a case, when the relationship between the time interval Ua during which the second print-mark-printing element 11*h* on the gravure roll 11 passes by and the position at which the second print mark is actually printed is determined in advance, the position at which the second print mark is printed is determined on the basis of the time interval Ua. Other constructions of the third modification are the same as those of the second modification.

Other Modifications of Preferred Embodiments

In the above-described preferred embodiments, only one camera is arranged behind the gravure roll 11 for photographing the first and the second print marks. However, the first and the second print marks may also be photographed with different cameras. More specifically, two cameras may be arranged behind the second gravure roll 11 in addition to the camera for photographing the trigger mark.

In addition, in the second modification, two sensors for measuring the time intervals during which the first and the second print marks pass by may be arranged behind the second gravure roll 11.

In addition, according to the present invention, only the position of the composite sheet along the width thereof may be controlled by moving the second gravure roll along its axis.

In the above-described preferred embodiments and modifications, the first paste is a conductive paste and the second paste is a step-reducing ceramic paste. However, the first paste may be a step-reducing ceramic paste and the second paste may be a conductive paste. In addition, both of the first and second pastes may be a conductive paste. The first and second pastes are both conductive when, for example, electrode patterns of different shapes are formed of the first and the second pastes, a structure is formed using conductive pastes of different materials, or double coating is required.

The present invention is not limited to multilayer ceramic electronic components, and may also be applied to methods for manufacturing other ceramic electronic components.

The present invention is not limited to the above-described preferred embodiments, but can be modified within the scope of the attached claims. Further, the technologies disclosed in the above-described preferred embodiments can be used in combination, as desired.

What is claimed is:

1. A method for manufacturing a ceramic electronic component, comprising:
    a preparation step of preparing a long composite sheet including a supporting film and a ceramic green sheet disposed on the supporting film;
    a first gravure-printing step of applying first paste to the ceramic green sheet in a first region of the ceramic green sheet by gravure printing; and
    a second gravure-printing step of applying second paste to the ceramic green sheet in a second region of the ceramic green sheet by gravure printing; wherein
    a first print mark is formed on the ceramic green sheet or the supporting film in the first gravure-printing step;
    a second print mark is formed on the ceramic green sheet or the supporting film in the second gravure-printing step; and
    actual transit times of the first and the second print marks formed in the first and the second gravure-printing steps, respectively, are compared with desired transit times of the first and the second print marks, and a subsequent second gravure-printing step is performed in accordance with the result of the comparison.

2. A method for manufacturing the ceramic electronic component according to claim 1, wherein the subsequent second gravure-printing step is performed after the ceramic green sheet is moved along at least one of the width and the length thereof in accordance with the result of the comparison or while the ceramic green sheet is being moved along at least one of the width and the length thereof in accordance with the result of the comparison.

3. A method for manufacturing the ceramic electronic component according to claim 1, wherein a first sensor and a first measuring device are used for determining the transit time of the first print mark.

4. A method for manufacturing the ceramic electronic component according to claim 1, wherein the dimension of the first print mark extending along the length of the ceramic green sheet changes along the width of the ceramic green sheet.

5. A method for manufacturing the ceramic electronic component according to claim 1, wherein the dimension of at least one of the first print mark and the second print mark extending along the length of the ceramic green sheet changes along the width of the ceramic green sheet.

6. A method for manufacturing the ceramic electronic component according to claim 1, wherein the first print mark has a substantially triangular shape.

7. A method for manufacturing the ceramic electronic component according to claim 1, wherein the first print mark and the second print mark have substantially triangular shapes.

8. A method for manufacturing the ceramic electronic component according to claim 1, wherein one of the first paste and the second paste is a conductive paste and the other of the first paste and the second paste is a step-reducing ceramic paste.

9. A method for manufacturing the ceramic electronic component according to claim 1, wherein the first paste and the second paste are conductive pastes.

* * * * *